Jan. 6, 1953
S. S. KISTLER
2,624,097
METHOD OF MAKING DENSE, HARD, ABRASION
RESISTANT CERAMIC ARTICLES
Filed Jan. 9, 1951
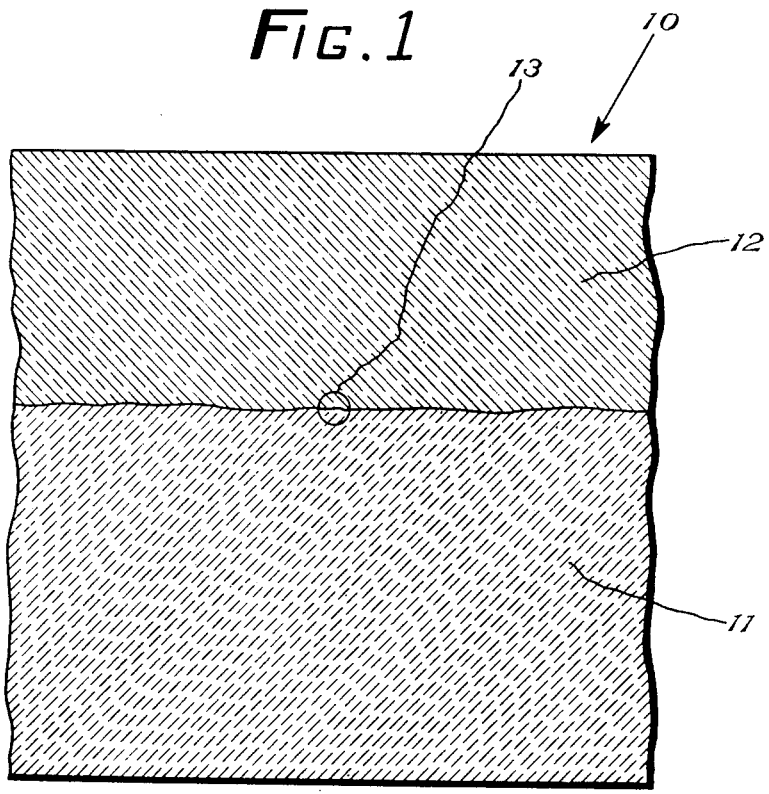
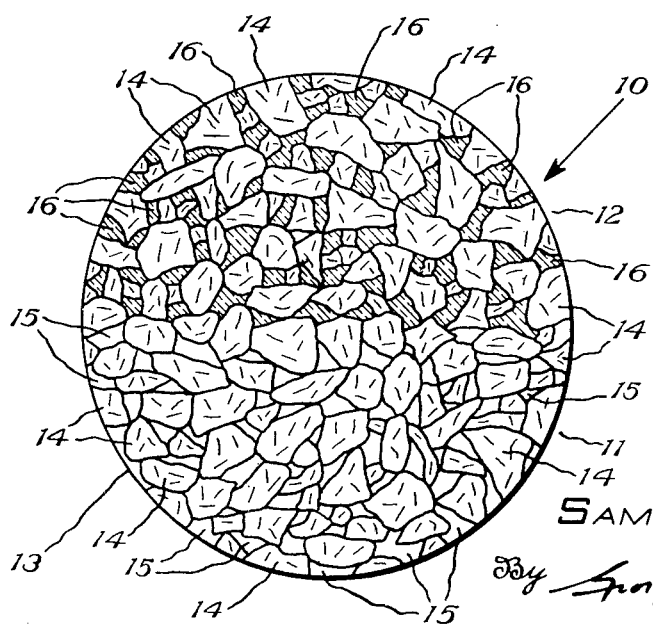
Inventor
SAMUEL S. KISTLER
By George Crompton Jr.
Attorney Patented Jan. 6, 1953

2,624,097

UNITED STATES PATENT OFFICE 2,624,097

METHOD OF MAKING DENSE, HARD, ABRASION RESISTANT CERAMIC ARTICLES

Samuel S. Kistler, West Boylston, Mass., assignor to Norton Company, Worcester, Mass., a corporation of Massachusetts Application January 9, 1951, Serial No. 205,211

1 Claim. (Cl. 25—156)

The invention relates to method of making surface plates, liners and the like. This application is a continuation in part of my copending application Serial No. 73,938 filed February 1, 1949.

One object of the invention is to make a superior surface plate, for measuring and gaging parts in machine shops and the like. Another object of the invention is to manufacture highly wear resistant parts for mixing machines and the like. Another object of the invention is to provide an improved method for making liners for the cylinders of internal combustion engines, steam engines, pumps and the like, so that the liners will be extremely resistant to wear.

Another object of the invention is to provide a more facile method for the manufacture of dense, hard refractory abrasion resistant ceramic bodies. Another object of the invention is to provide a method of manufacturing certain types of ceramic bodies without the necessity of utilizing extremely high pressures for molding. Another object of the invention is to manufacture articles of the class indicated out of ceramic materials by ramming as distinguished from pressing, thereby increasing production and reducing the cost of manufacture. Another object of the invention is to provide a method of manufacturing ceramic bodies to make them more resistant to abrasion. Another object of the invention is to provide a method to increase versatility of manufacture in the ceramic arts as by simplifying manufacturing operations or by increasing the numbers of kinds of products which can be readily manufactured. Other objects of the invention are to provide superior abrasion resistant parts for various articles and machines such as gages, cylinders, journals and pumps of many descriptions including centrifugal pumps.

Other objects will be in part obvious or in part pointed out hereinafter.

In the accompanying drawings illustrating an embodiment of the invention,

Figure 1 is a sectional view of a ceramic article embodying the invention on an enlarged scale, the section being illustrated in accordance with the current Patent Office conventions, Figure 2 is a highly magnified view of a portion of the section of Figure 1 illustrating the individual granules of zirconia in elevation and the glass in the interstices between granules in a portion of the section.

My invention is concerned with bodies or articles consisting largely of zirconia, particularly fused stabilized zirconia made as described in U. S. Letters Patent No. 2,535,526 granted December 26, 1950, on application of A. H. Ballard and D. W. Marshall. That patent describes the stabilization of zirconia with from 3% to 6% of lime, CaO. However, I may, as indeed is described in the aforesaid patent, add a portion of unstabilized zirconia. The zirconia is originally in comminuted or granular form and at least 30% by volume of the article consists of such granular zirconia.

The surface plates, liners and the like of the present invention are made in part out of fused stabilized zirconia which can be made by a process comprising fusing in an electric arc furnace an ore containing $ZrO_2$ together with a quantity of carbon which is two-thirds of the theoretical quantity of carbon required completely to reduce the silica plus 100% of the theoretical quantity required to reduce all the other oxides (except zirconia) to metal with up to 40% excess over the total of these quantities and together with an amount of iron that is enough to make with two-thirds of the silicon a ferro-silicon having an iron content of 75% to 85% minus the amount of iron obtained by the reduction of the iron oxide in the ore to iron, and together with a stabilizing agent consisting of calcium oxide, the quantity of stabilizing agent being from 3% to 6% of the amount of $ZrO_2$ in the ore. This fused stabilized zirconia (zirconium oxide) can be defined as a stabilized zirconium oxide characterized by having a crystal structure predominantly in the cubic system and the oxide having crystallized from a fusion of zirconium oxide containing ore with calcium oxide as a stabilizing agent, the quantity of calcium oxide being from 3% to 6% of the amount of $ZrO_2$ in the ore, the calcium oxide being in solid solution in the zirconium oxide crystals.

Example

A tube two and seven-eighths inches outside diameter by one and seven-eighths inches inside diameter was made as follows: sixty parts of 32 grit size to 90 grit size fused stabilized zirconia, thirty parts of 100 grit size and finer fused stabilized zirconia, ten parts of 200 grit size and finer unfused and unstabilized zirconia (the monoclinic variety), one part of dextrine and three parts of water were thoroughly mixed together, placed in an hydraulic molding machine having a rubber molding tube and a steel arbor, and therein the mixture was pressed into a tube. This tube was dried and fired at cone 35 (top temperature 1750° C.). A ring was cut from this tube one-half inch long and this was impregnated with glass by soaking in a tank of molten glass at 1000° C. The glass had the following composition:

|  | Parts by weight |
| --- | --- |
| SiO$_2$ | 41.4 |
| B$_2$O$_3$ | 28.7 |
| PbO | 19.7 |
| Na$_2$O | 5.7 |
| CaO | 2.4 |
| Al$_2$O$_3$ | .8 |
| LiF | 1.3 |

The ring was lifted from the tank of glass, drained briefly and allowed to cool slowly. Virtually all of the pores in this ring were filled with the glass. After cooling the ring was ground inside and out and on the flat surfaces, and then the ring was shrunk into a steel sleeve for use as an hydraulic seal around the shaft of an oil pump. In many applications, however, impregnation will be only to a depth, not less than one-sixteenth of an inch, in the zirconia piece.

Referring now to the drawings, Figure 1 shows a section of an article 10, considerably magnified, consisting in a base portion 11 of granules of zirconia, the granules being sintered together that is to say having actually grown together to form a continuous interlacing integral structure but with interstices. This base portion 11 is integrally united to a surface layer 12 comprising the same granules also sintered and grown together but in the surface layer 12 glass without anastomosing pores fills the interstices between the granules. In Figure 1 I have drawn a small circle 13 and the area of this circle 13 is shown greatly magnified in Figure 2. It will be seen that the area of this circle 13 includes part of the base portion 11 and part of the surface layer 12.

In Figure 2 can be seen the individual granules 14 both in the base portion 11 and in the layer 12. I have drawn irregular lines on the granules 14 to represent creases or other irregularities so that in the base portion 11 they will stand out from the interstices or pores 15. These pores 15 are anastomosing, that is to say they connect to one another in the third dimension. Interstices of anastomosing pores are a direct resultant of sintering or self bonding a mixture of irregular shaped granules.

Still referring to Figure 2, it will be seen that all the interstices between the granules 14 in the surface layer 12 are filled with glass 16 and this glass has no anastomosing pores.

According to my invention the surface layer 12 containing no anastomosing pores should be at least 1/16 inch thick but it is possible to make it a good deal thicker and it is desirable in many cases to do so. In my copending application, Serial No. 197,278 filed November 24, 1950, I have described and claimed liners for cylinders of internal combustion engines and the like comprising refractory cylinders enclosed in metal sleeves shrunk thereon to put the refractory cylinders under compression. This present invention in one of its aspects is an improvement on the invention of my copending application aforesaid insomuch as the liner will wear much longer if it has an inside surface layer according to this invention, that is to say impregnated with glass having no anastomosing pores. And I find that more refractory structures can be made by self bonding or sintering the granules together as in accordance with the foregoing description rather than by using such a large proportion of vitrifiable bond in the first place that the granules are initially connected by vitrified ceramic material. In the case of such cylinder liners for internal combustion engines, pumps and the like, the layer 12 may be only 1/16 inch thick because the entire liner should be replaced when it has worn to the extent of 1/16 of an inch on the radius but this will not happen for years. On the other hand other articles such as impeller blades for centrifugal pumps which are pumping ore are better impregnated with glass to a greater depth than 1/16 of an inch. I have found it possible to impregnate bodies of the kind herein described to a depth of a full inch and as sometimes the articles made therefrom are no more than one inch thick, they may be impregnated with glass throughout and in such case there will be no base portion 11 and the entire structure will be that of the layer 12.

For cylinder liners, pump seals and surface plates the surface of the layer 12 should be ground as by using a diamond grinding wheel, but for many articles such as the impeller blades mentioned grinding of the surface may not be necessary.

It is desirable that articles according to this invention be refractory. Zirconium oxide is especially refractory having a melting point of around 2700° C.

In the surface layer 12 the glass 16 not only has no anastomosing pores but it also fills the interstices between the granules without leaving any anastomosing pores.

In Figure 1 the layer 12 is considered to be one-sixteenth of an inch thick so therefore Figure 1 itself represents a considerable magnification. Figure 2 is obviously a great magnification of a portion of Figure 1. Therefore in Figure 2 the individual granules 14 which are large enough in the drawing to be easily seen in reality represent very small particles.

Chemists can usually not tell the difference between the elements zirconium and hafnium by ordinary chemical testing methods. A mixture of these elements in a compound or otherwise is accordingly consistently reported as zirconium. That is to say what is considered to be practically 100% pure zirconium oxide is usually actually a mixture of zirconium oxide and hafnium oxide. The words zirconia and zirconium oxide accordingly are here used in this accepted sense to include products of even a large proportion of hafnium oxide. Since chemists cannot by ordinary chemical methods distinguish these elements or their compounds, it follows that they have the same properties.

The surface plates, liners and the like according to the invention consist, before the glass is added, of at least 97% by weight of zirconium oxide (including any hafnium oxide) and of this zirconium oxide at least 80% by weight is stabilized zirconium oxide as above defined.

It will thus be seen that there has been provided by this invention an article and a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

Method of making a dense hard abrasion resistant ceramic article which comprises shaping a body out of at least 30% by volume of granules at least 97% by weight pure of zirconium oxide which is at least 80% by weight stabilized zirconium oxide characterized by having a crystal structure predominantly in the cubic system and the oxide having crystallized from a fusion of zirconium oxide containing ore with calcium oxide as a stabilizing agent, the quantity of calcium oxde being from 3% to 6% by weight of the amount of $ZrO_2$ in the ore, the calcium oxide being in solid solution in the zirconium oxide crystals, compacting and firing the body to cause said granules to grow together apart from any bond included therewith, then impregnating said body on at least one surface with molten glass to a depth of at least one-sixteenth of an inch, the glass being fluid enough so as to fill the interstices between granules with glass without any anastomosing pores to said depth of one-sixteenth of an inch.

SAMUEL S. KISTLER.

REFERENCES CITED

The following references are of record in the file of this patent:

UNITED STATES PATENTS

| Number | Name | Date |
|---|---|---|
| 1,991,918 | Berchtold | Feb. 19, 1935 |

FOREIGN PATENTS

| Number | Country | Date |
|---|---|---|
| 569,282 | Great Britain | May 16, 1945 |